Patented Sept. 4, 1934

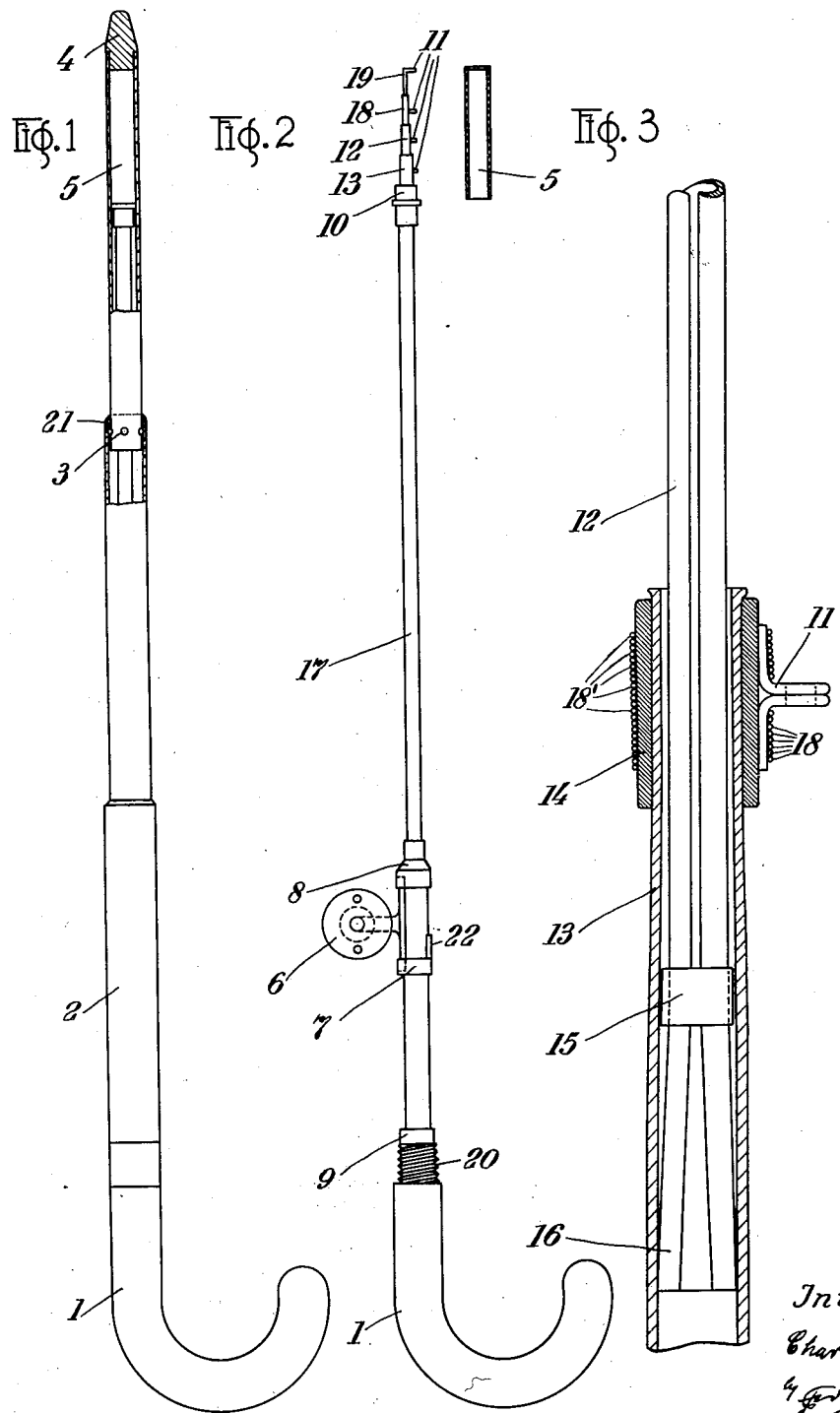

1,972,518

UNITED STATES PATENT OFFICE 1,972,518

WALKING STICK FISHING ROD

Charles Grandjean, Nidau, Switzerland

Application July 12, 1932, Serial No. 622,093
In Switzerland May 24, 1932

1 Claim. (Cl. 43—18)

Walking stick fishing rods are known, the extensible telescopic tubes of which are slotted along a portion of their length, the upper portion of the inner tube and the lower portion of the outer tube being each provided with a rigid ring, which rings prevent the tubes from being pulled out too far.

The known walking stick fishing rods are open to the objection that the individual tubes, when they are extended, are not securely held without play relative to one another. As the tubes are only partly longitudinally slotted, they possess on the one hand less elasticity and adaptability to the diameter of the neighbouring tubes than tubes which are slotted along their entire length. On the other hand the play is caused by the fact that the extended tubes are only guided on a very short length, namely on the length of the ring which is fitted on the ends of the tubes. These objections are overcome by the invention which consists in an improved walking stick fishing rod having telescopic expansible tubes, and characterized in that the tubes are slotted along their entire length.

An embodiment of the invention is illustrated by way of example in the accompanying drawing in which:—

Fig. 1 shows the walking stick fishing rod in closed condition partly in longitudinal section.

Fig. 2 shows the fishing rod without tubular casing but not extended.

Fig. 3 shows a detail of the steel tube guide on a larger scale.

A steel tube 17 is fixed on a handle 1. In this steel tube 17, telescopic slotted steel tubes 13, 12, 18 and 19 are accommodated. These slotted steel tubes 12, 13, 18 and 19 have line eyes 11 for threading the fishing line. In closed condition the ends of the tubes 12, 13, 18 and 19 are covered by a closing element 5 which fits on a seat 10. When using the fishing rod as a walking stick, the rod is covered by a tubular casing 2 which bears tightly with its point 4 on the element 5 and is screwed at the other end onto the screw 20. The individual sections of the casing 2 are secured against pulling out by shoulders 21 and projections 3. If it is desired to employ the rod for fishing, the tubes 12, 13, 18 and 19 are merely pulled apart and thus brought into their position for use. A reel 6 may be fitted near the handle portion of the rod as shown in Fig. 2, by means of a clip 8 and a ring 7 or by means of a clip 9 and the ring 7. The ring 7 may fit tightly with its end 22 in the clip 8 to prevent rattling.

In Fig. 3 is a part section on a much larger scale showing the arrangement of the tube 12 in the tube 13 in extended condition. The tube 13 is narrowed at its outer end and carries a clip 14 on which the line guide 11 is fixed by a binding element 18'. The tube 12 is widened at its inner end and extended so that it always bears resiliently against the wall of the tube 13. Moreover a ring 15 is fixed on the tube 12 and enables a reliable guiding and holding of the tube 12. The tube 13 is narrowed at its upper end in such a manner that the tube 15 and the tube 12 connected thereto cannot be completely pulled out. When the ring 15 is pulled out as far as possible, it fits in the tube 13 absolutely without play owing to the narrowing of this tube. The other tube lengths are shiftably mounted, the one in the other and secured against dropping out in a similar manner.

Owing to the special arrangement and fitting of the stick casing 2 on the other parts in closed position, it is possible, when using the rod as a walking stick, to impart thereto very great rigidity and positively prevent a rattling of the individual parts. The metal parts are preferably non-rusting. The entire pressure, when using the rod as a walking stick, then bears on the point 4 and is transmitted therefrom to the sleeve situated on a projection 10 of the steel tube 17 and to the steel tube 17 rigidly connected to the handle 1. The point 4 and sleeve 5 are preferably made in one piece. It is evident that a greater or fewer number of telescopic parts than shown may be employed and it is also possible to solder the line guide eyes 11 on the clips 14 or to make them in one piece therewith.

I claim:—

In a walking stick fishing rod the combination of extensible telescopic tubes slotted along their entire length, a point on the inner of said tubes, a handle on the outer of said tubes, and a casing adapted to cover said tubes in telescoped condition and to transmit pressure exerted on said handle directly to said point.

C. GRANDJEAN.